US012770497B2

(12) United States Patent
Dix

(10) Patent No.: US 12,770,497 B2
(45) Date of Patent: Oct. 20, 2026

(54) AI-BASED ALARM PREDICTION IN PROCESS CONTROL SYSTEMS

(71) Applicant: ABB Schweiz AG, Baden (CH)

(72) Inventor: Marcel Dix, Allensbach (DE)

(73) Assignee: ABB Schweiz AG, Baden (CH)

( * ) Notice: Subject to any disclaimer, the term of this patent is extended or adjusted under 35 U.S.C. 154(b) by 42 days.

(21) Appl. No.: 18/899,108

(22) Filed: Sep. 27, 2024

(65) Prior Publication Data

US 2025/0111767 A1 Apr. 3, 2025

(30) Foreign Application Priority Data

Sep. 28, 2023 (EP) ..................................... 23200606

(51) Int. Cl.

*G08B 25/08* (2006.01)
*G08B 21/18* (2006.01)
*G08B 25/00* (2006.01)

(52) U.S. Cl.

CPC ......... *G08B 25/008* (2013.01); *G08B 21/182* (2013.01)

(58) Field of Classification Search

CPC ............................ G08B 25/008; G08B 21/182
USPC .......................................................... 340/4.3
See application file for complete search history.

(56) References Cited

U.S. PATENT DOCUMENTS 9,959,734 B1 * 5/2018 Figura .............. G01R 19/16576
11,016,468 B1 * 5/2021 Barker ..................... G07C 3/08
11,225,680 B2 * 1/2022 Nakazono .......... G01N 33/1866
11,640,328 B2 * 5/2023 Burch ................. G06F 11/0706 714/37
2009/0319720 A1 * 12/2009 Stefanus ............. G06F 12/0246 711/E12.083
2016/0125730 A1 * 5/2016 Sloo ......................... F24F 11/30 340/506
2016/0217379 A1 * 7/2016 Patri .................. G05B 13/0265
2018/0225166 A1 * 8/2018 Maya ................... G05B 23/024
2022/0382267 A1 * 12/2022 Kashiwa .............. G05B 23/027
2022/0404310 A1 * 12/2022 Matsushita ........ G01N 27/4163
2022/0414526 A1 * 12/2022 Darrah ................... G06N 3/098
2023/0034769 A1 * 2/2023 Chioua ................ G05B 13/027
2023/0061280 A1 * 3/2023 Rohrkemper .......... G06N 20/00
2023/0185646 A1 * 6/2023 Yang .................. G05B 23/0232 714/47.2
2023/0324897 A1 * 10/2023 Hotta ................. G05B 23/0272 700/108

(Continued)

OTHER PUBLICATIONS

ABB, "System 800xA Configuration, Version 6.0," manual, *ABB*, 690 pp. (Sep. 2016).

(Continued)

*Primary Examiner* — Zhen Y Wu

(74) *Attorney, Agent, or Firm* — Fitch Even Tabin & Flannery LLP

(57) ABSTRACT

A method for managing alarms in a distributed control system, wherein the method comprises the following steps: monitoring at least one process parameter, activating an alarm when the process parameter exceeds an alarm threshold, deactivating an alarm when the process parameter no longer exceeds the alarm threshold, and determining by an AI based alarm control system before the alarm is activated at least one predicted alarm information, which comprises information about whether the alarm threshold will be exceeded.

14 Claims, 4 Drawing Sheets

(56) References Cited

U.S. PATENT DOCUMENTS

| | | | | |
|---|---|---|---|---|
| 2023/0418701 | A1* | 12/2023 | Wakui | G06F 11/3006 |
| 2025/0298688 | A1* | 9/2025 | Zhang | G01D 21/02 |

OTHER PUBLICATIONS

Cai et al., "Process Alarm Prediction Using Deep Learning and Word Embedding Methods," *ISA Transactions*, 85: 274-283 (Feb. 2019).

Dix et al., "An AI-based Alarm Prediction in Industrial Process Control Systems," 2022 *IEEE International Conference on Big Data and Smart Computing* (*BigComp*), 4 pp. (Jan. 17-20, 2022).

Görgülü et al., "Machine Learning Methods for Alarm Prediction in Industrial Informatics: Review and Benchmark," *International Symposium on Distributed Computing and Artificial Intelligence, Cham: Springer Nature Switzerland*, 742: 21-30 (Jul. 20, 2023).

Villalobos et al., "A Flexible Alarm Prediction System for Smart Manufacturing Scenarios Following a Forecaster-Analyzer Approach," *J. of Intelligent Manufacturing*, 32: 34 pp. (Jun. 2021).

European Patent Office, Extended European Search Report in European Patent Application No. 23200606.4, 7 pp. (Mar. 21, 2024).

* cited by examiner

AI-BASED ALARM PREDICTION IN PROCESS CONTROL SYSTEMS

CROSS-REFERENCE TO RELATED APPLICATIONS

The instant application claims priority to European Patent Application No. 23200606.4, filed Sep. 28, 2023, which is incorporated herein in its entirety by reference.

FIELD OF THE DISCLOSURE

The present disclosure generally relates to a system and a method for managing alarms in a distributed control system.

BACKGROUND OF THE INVENTION

In industrial process control systems, an "alarm system" is a standard feature that defines various alarms to alert operators to take corrective actions when predefined critical thresholds are exceeded. During plant engineering, alarms are defined based on thresholds that may not be exceeded on different sensor measurements, e.g., temperature, flow, pressure, or level sensors. During plant operation, an alarm is raised if any of these thresholds are exceeded. Plant engineering and operation can be accomplished by distributed control systems, which allows the implementation and control of the various parts and systems of a plant.

When an alarm is raised, the operator must take corrective action in the control system, such as opening or closing a valve, to steer the production back into a normal fairway. In many alarm situations, there is only limited time for an operator to react, thus, demanding the operator to be at a high level of awareness and attentiveness all the time. An alarm that is not handled timely by the operator may further advance into a more critical plant situation, leading to possible production losses, damages of the systems and standstills.

The complex interactions between the various parts and systems of a plant often make it difficult for the operator controlling some or more of the plant's systems to decide what actions are appropriate to adequately handle and resolve the alarm. In addition, when a user takes a countermeasure to react on an alarm, this user action may have undesirable further effects on other systems, which an operator may not be able to anticipate.

BRIEF SUMMARY OF THE INVENTION

The present disclosure describes a method for managing alarms in a distributed control system. The method comprises the step of monitoring at least one process parameter. The method further comprises the step of activating an alarm if the process parameter exceeds an alarm threshold. The method further comprises the step of deactivating an alarm if the process parameter no longer exceeds the alarm threshold. The method further comprises the step of determining by an AI based alarm control system before the alarm is activated at least one predicted alarm information, which comprises information about if the alarm threshold will be exceeded. Accordingly, in improved alarm managing method is provided, wherein the employment of an AI-based alarm prediction may help operators to predict alarm situations even before they occur.

A distributed control system may be understood as a control system for a process or plant comprising usually one or more control loops, in which autonomous controllers are distributed throughout the system. Such distributed control systems may be computer supported. Even though the method of the present invention is described herein with respect to a distributed control system, the advantages of the method and system according to the invention may of course be applied also to any other suitable industrial process control system known to those skilled in the art.

BRIEF DESCRIPTION OF THE SEVERAL VIEWS OF THE DRAWING(S)

FIG. 1 schematically illustrates a method for managing alarms in a distributed control system according to the present disclosure.

DETAILED DESCRIPTION OF THE INVENTION

Figure 1:
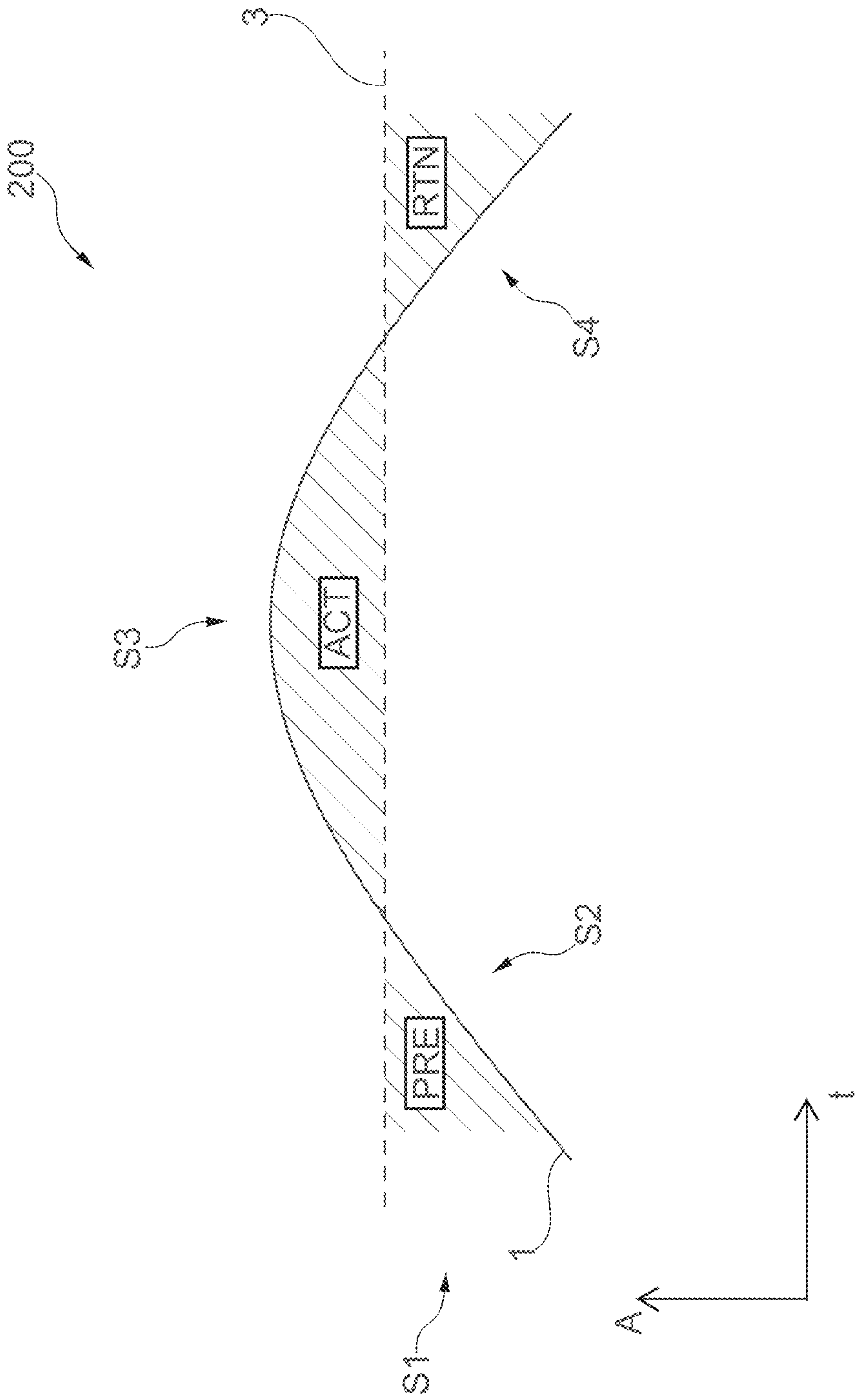

FIG. 1 depicts an embodiment of a method 200 for managing alarms in a distributed control system according to the present disclosure. Herein, the process parameter 1 is monitored. On the horizontal axis, the time "t" is depicted and on the vertical axis, an amplitude "A" of the process parameter 1 is depicted. As indicated in the figure, the process parameter 1 starts at a level below an alarm threshold 3 and initially rises over time.

In step S2, it is predicted by an AI based alarm control system 9 if the alarm threshold 3 will be exceeded. In the figure, the state of the alarm is denoted as "PRE" indicating that respective predicted alarm information is determined by the AI based alarm control system 9 before the alarm is activated. Thus, based on the predicted alarm information, it may be indicated to a user that an alarm threshold 3 will be exceeded. Hence, a respective control may be performed or adapted with the goal to avoid that the process parameter 1 exceeds the alarm threshold 3.

When the process parameter 1 exceeds an alarm threshold 3, an alarm is activated as indicated in step S3. In the figure, the state of the alarm is noted as "ACT" indicating that the alarm is "active". The alarm may stay activated as long as the process parameter 1 exceeds the alarm threshold 3. After a control parameter of the process parameter 1 has been adapted, the process parameter 1 starts to decrease.

When the process parameter 1 no longer exceeds the alarm threshold 3, the alarm is deactivated as indicated in step S4. In the figure, the state of the alarm is noted as "RTN" indicating that the system returns to normal conditions.

The depicted embodiment does not delimit the claimed method, but also any timely progression of the process parameter 1 may be conceived. Hence, it will be understood, that the process parameter 1 may also decrease over time and an alarm threshold 3 is defined as a lower threshold, below which an alarm is issued. In such a scenario, an alarm is activated once the process parameter one falls below the alarm threshold 3. The method according to the present invention then accordingly allows determining a respective predicted alarm information by the AI based alarm control system 9 in a "PRE"-state, preferably before the process parameter 1 falls below the alarm threshold 3.

Figure 2:
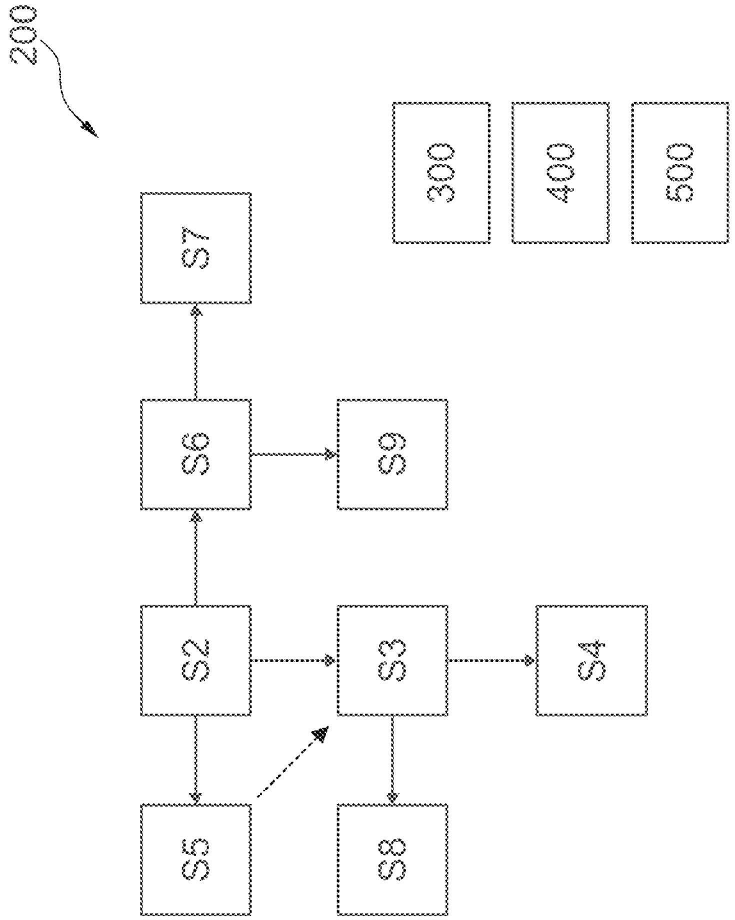
FIG. 2 is a flowchart illustrating a method for managing alarms in a distributed control system according to the present disclosure.

FIG. 2 depicts a flowchart illustrating a method for managing alarms in a distributed control system according to the present invention. The depicted flowchart is based on a monitoring of at least one process parameter 1 (cf. step S1 of FIG. 1). In step S2, based on the monitoring of at least one process parameter 1, at least one predicted alarm information is determined by an AI based alarm control system 9. The determination can be performed before the alarm is activated. The predicted alarm information comprises information about if and/or when the alarm threshold will be exceeded. In step S3, the process parameter 1 exceeds an alarm threshold 3 and an alarm is activated. The alarm may stay activated as long as the process parameter 1 exceeds an alarm threshold 3. In step S4, the process parameter 1 no longer exceeds an alarm threshold 3 and an alarm is deactivated. The system 100 then returns to the normal operation state. In step S5, the predicted alarm information is provided to a user. This may be performed before the alarm is activated, i.e. before step S3, as indicated by the broken arrow. In step S6, at least one control parameter of the distributed control system is determined, which control parameter can be adapted to reduce a likelihood that the alarm threshold 3 will be exceeded. This may be done by the AI based alarm control system 9.

In step S7, at least one control parameter information is provided to the user. The control parameter information comprises information about the control parameter of relevance. The control parameter information can also comprise information about at least one suitable adaption of the control parameter to reduce the likelihood that the alarm threshold will be exceeded. This may help the user to apply the correct countermeasures to avoid a future alarm.

In step S8, the alarm information is provided to the user when the alarm is activated. This may include for instance information about the type of the alarm and the process parameter 1 concerned. Herein, the alarm information and the predicted alarm information can be provided together or separately to a user.

In step S9, the control parameter are automatically adapted to reduce the likelihood that the alarm threshold will be exceeded. Thus, the future alarm could be avoided before it is activated.

It will be understood that the method according to the present invention is not limited to the above noted order of method steps, and may be also provided in a different order and one or more of the above noted method steps may be removed or further method steps may be added, as desired.

Further, a computer-program product 300 and a computer-readable medium 500 is schematically depicted, each comprising instructions, which, when executed by a computer 400, cause the computer 400 to carry out the method of the present disclosure, in particular the method 200 shown in FIGS. 1 and 2.

Figure 3:
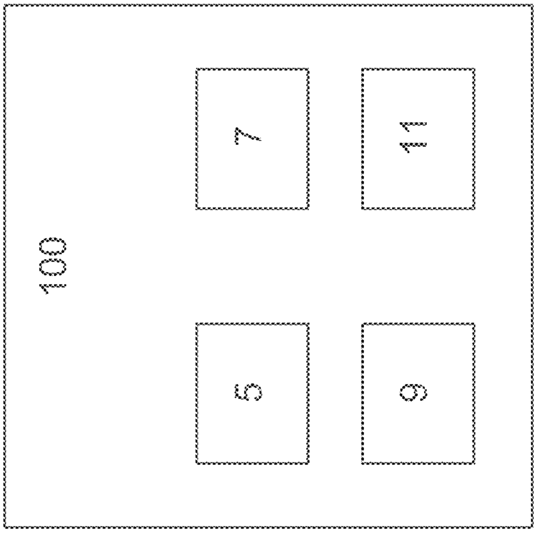
FIG. 3 is a schematic for a system for managing alarms in a distributed control system according to the present disclosure.

FIG. 3 schematically depicts a system 100 for managing alarms in a distributed control system according to the present disclosure. The system 100 comprises a process parameter monitoring means 5, configured to monitor at least one process parameter 1. This process parameter monitoring means 5 may comprise respective detectors or further measurement means suitable for measuring an amplitude, level etc. of a process parameter 1 to be controlled. The system 100 further comprises an alarm control means 7, configured to activate an alarm if the process parameter 1 exceeds an alarm threshold 3. Thus, the alarm control means 7 may comprise one or more suitable means to issue an alarm. Further, the alarm can be deactivated by the alarm control means 7 if the process parameter 1 no longer exceeds the alarm threshold 3. In such a case, the system may return to the normal operation state. The system 100 further comprises an AI based alarm control system 9, which is configured to determine a predicted alarm information. This determination is preferably performed before the alarm is activated. Thus, forecast information about the potential future alarm can be provided. The predicted alarm information accordingly includes information about if and/or when the alarm threshold 3 will be exceeded.

The system 100 further comprises an information means 11, which is configured to provide the predicted alarm information to a user. This may include one or more monitor(s) or display visually indicating the predicted alarm information. Alternatively or additionally, the information means 11 may include one or more audio device(s) acoustically indicating the predicted alarm information.

Figure 4:
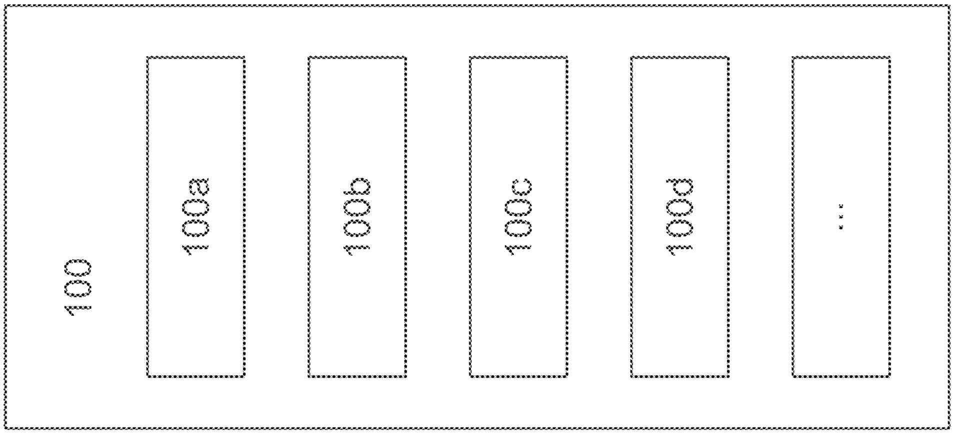
FIG. 4 is a schematic for a system for managing alarms in a distributed control system according to the present disclosure.

FIG. 4 schematically depicts a system 100 for managing alarms in a distributed control system according to the present invention. The system 100 comprises a plurality of control sub-systems 100*a*, 100*b*, 100*c*, 100*d*, which may integrated in the distributed control system. Each of the plurality of control sub-systems 100*a*, 100*b*, 100*c* and 100*d* is selectively addable to and/or removable from the distributed control system. Further control sub-systems may be provided, as indicated by the " . . . " in the lowest box of the figure.

The AI based alarm control system 9 is provided as a control sub-system, i.e. as an AI based alarm control sub-system 100*a*. The system 100 also comprises a non-AI based alarm control sub-system 100*b*, configured to add or remove one or more first alarm rules for managing alarms of the distributed control system. The system 100 may be further configured to allow an addition or removal of one or more second alarm rules defined by the AI based alarm control sub-system 100*a* for managing alarms of the distributed control system. The system 100 may also be configured to allow a modification of the first alarm rules by the AI based alarm control sub-system 100*a* to create one or more modified first alarm rules for managing alarms of the distributed control system.

When the system 100 is embodied as a software or computer program (product), the control sub-systems 100*a*, 100*b*, 100*c*, 100*d* may be embodied as respective software features that may be added or removed by a user as needed for properly controlling the distributed control system.

The monitoring of the at least one process parameter may occur continuously, e.g. without interruptions, or at given one or more time instances, e.g. with a certain duration. Further, the monitoring may be bound to further conditions. For instance, the monitoring of a process parameter may only start if a certain threshold of the process parameter is exceeded.

The activation of the alarm may include a single activation once the alarm threshold is exceeded, a continuing activation and/or a repeated activation at one or more time instances, e.g. an activation over a certain time. The alarm may accordingly assume an "ACT" state, indicating an "active state" of the alarm. This state may be accordingly logged in alarm lists and alarm logs of the distributed control system.

The alarm may be activated once a certain alarm threshold is exceeded. This may include a situation, wherein the process parameter rises over time and wherein the alarm threshold defines an upper limit up to which normal working conditions of the process parameter can be assumed.

A process parameter can be understood as any entity, such as, for instance, physical or electrical conditions, relevant for a system operation. For instance, the process parameter may be a system pressure at which a plant's system operates and the alarm threshold may correspond to an upper limit of the pressure up to which a proper operation of a plant's system can be ensured. In one embodiment, the alarm may be activated when the process parameter decreases over time and the threshold defines a lower limit down to which normal working condition of the process parameter can be assumed. For instance, the process parameter may be a current at which a plant's system operates and the alarm threshold may correspond to a lower limit down to which a proper operation of a plant's system can be ensured.

An alarm threshold may be a predefined value for a process parameter above or below which an alarm may be issued. In other words, a process parameter moves outside a predefined "normal working condition" region, an alarm may be activated. Also more than one alarm threshold may be provided for one or more process parameters. Furthermore, also a plurality of upper and/or lower alarm thresholds may be provided and connected to different states of the alarm. Thus, different alarms may be activated, e.g. a "low-level-alarm", a "medium-level-alarm" and/or a "high-level-alarm", depending on how critical a monitored process parameter value is.

The deactivation of the alarm may include the single deactivation once the alarm no longer exceeds the threshold, a continuing deactivation and/or a repeated deactivation at one or more time instances, e.g. a deactivation over a certain duration. The alarm may assume an "RTN" state when the alarm is deactivated indicating a "return to normal" operation. This state may be accordingly logged in alarm lists and alarm logs of the distributed control system.

The determination of the at least one predicted alarm information may be performed continuously or at certain one or more predefined time instances. Further, the determination may be bound to further conditions. For instance, the determination may start only once a certain threshold of the process parameter is exceeded. The alarm may assume a "PRE" state, indicating a "prediction state", in which prediction information is determined by an AI based alarm control system. This state may be accordingly logged in alarm lists and alarm logs of the distributed control system.

An AI based alarm control system may include any suitable AI-based software or algorithm and/or machine learning means suitable to provide a prediction or forecast information of the further development of the monitored process parameter. The AI based alarm control system may be trained by historical data and/or simulated data. Further, the AI based alarm control system may consider for the prediction any suitable parameter that may influence the future development of the monitored process parameter. Likewise, the AI based alarm control system may consider in its forecast any interaction with one or more other systems of the distributed control system and respective further process parameters that may have an impact of the future development of the monitored process parameter.

The predicted alarm information may include a forecast or prediction regarding the timely development of the process parameter and may include the determination of a likelihood or probability if an alarm threshold will be exceeded. In this respect, the predicted alarm information may also include a time information indicating a time when the process parameter is to be expected to exceed the alarm threshold. Furthermore, the predicted information may include a forecast about the level or value the process parameter may have at a future time, preferably considering certain conditions.

In a preferred embodiment, the method further comprises the step of providing the predicted alarm information to a user, preferably before the alarm is activated. Accordingly, users or operators controlling and operating one or more processes of a plant via the distributed control system may be provided with more time to prepare for the upcoming situation. Thus, operators may be allowed to run their plants more proactively, rather than reacting to different plant situations.

The predicted alarm information may be provided continuously to an operator or only at certain times or under certain conditions, e.g. in case the process parameter exceeds a certain pre-defined threshold. Such a pre-defined threshold may be different to the alarm threshold. This may be for instance a level, at which the process parameter still operates in a normal condition, but which exceed may indicate that the process parameter probably increases or decreases towards an alarm threshold. Such a pre-defined threshold may be for instance set in a way that an operator may have sufficient time to react on the changing process parameter.

In another example, an operator may be warned when an operator action is predicted to lead to a critical alarm. For example, every time when an operator changes a set point for a process value, the determination and provision of the predicted alarm information could be triggered to make a prediction if this operator action would lead to a critical alarm. In some situations, such an alarm may not be easily foreseen by the operator due to the complex process dynamics. However, the AI based alarm control system may be able to make this prediction based on deep knowledge about the process dynamics, e.g. from historic data. If a critical alarm is predicted to be a foreseeable consequence of the operator's action, the operator could be warned accordingly if this action should really be set in the system or not.

In a preferred embodiment, the method further comprises the step of determining, preferably by the AI based alarm control system, at least one control parameter of the distributed control system that can be adapted to reduce a likelihood that the alarm threshold will be exceeded.

In a further preferred embodiment, the method further comprises the step of providing at least one control parameter information to the user, wherein the control parameter information comprises information about the control parameter and/or wherein the control parameter information comprises information about at least one suitable adaption of the control parameter to reduce the likelihood that the alarm threshold will be exceeded. Accordingly, by determining the suitable control parameter, the method according to the present invention may enable a user to properly react to a forecasted alarm. This may include a timely counteraction to the forecasted development of the monitored process parameter for avoiding a future alarm.

The determination of the control parameter and/or the suitable adaption of said control parameter may be performed by the AI based alarm control system or by a different system. The control parameter may be a predefined control or setting, which may prevent that the determined process parameter exceeds the alarm threshold. Hence, an activation of the alarm may be prevented.

As an example, in case a pressure may be monitored and in case it may be forecasted by the AI based alarm control system that a certain threshold is exceeded in the future, a selected valve to release the pressure may be determined. This information may be accordingly provided to a user, who is consequently enabled to properly react, namely to open said selected valve for releasing the pressure before the pressure exceeds a certain alarm threshold, thus preventing an activation of the alarm.

The provision of the at least one control parameter information may include, for instance, a visual or acoustic indication of said control parameter information to a user. The user may not only be informed about the respective control parameter but may also be informed how the control parameter may be adapted to reduce the likelihood that the alarm threshold will be exceeded. This may also include the provision of one or more alternative options how to proceed further with the operation. Hence, an operator may be enabled to optimally adapt the one or more control parameters to positively influence the forecasted timely development of the process parameter. Considering the above noted pressure example, not only the selected valve but also a selected optimal degree of opening of the selected valve may be provided.

Furthermore, a sequence of multiple actions may be provided to a user. In a preferred embodiment, the method further comprises the step of providing at least one alarm information to the user when the alarm is activated, wherein the alarm information and the predicted alarm information are provided together or separately to a user. Thus, the method of the present invention may allow for an effective control and supervision of the distributed control system with respect to both, alarm information and predicted alarm information.

An alarm information may comprise information about that a process parameter has exceeded a predefined threshold. Further, a predicted alarm information may comprise information about that a process parameter is expected to exceed a predefined threshold. The provision of one or more alarm information and/or predicted alarm information to a user may include a visual indication, an acoustic indication or any further suitable method or means to provide the alarm information to the user.

For instance, the user may be provided with information about the monitored process parameter and the alarm threshold at which an alarm will be indicated. Alternatively or additionally, also a predicted alarm information may be provided to a user on the same or a different screen or display, wherein the user may supervise or monitor the process parameter and its forecasted development. Furthermore, both information may be provided at the same time or at different times and/or on the same or different screens. The alarm information and/or the predicted alarm information may be explained to user by an "Explainable AI (XAI)".

Thus, a user may be accordingly informed, e.g. by a warning on the screen, that a process parameter has exceeded the alarm threshold and/or will exceed the alarm threshold in the future. This may also include the provision of information about a probability or likelihood that the alarm threshold will be exceeded.

In one example, alarms may be displayed e.g. as a red alarm icon next to a process display where the alarm occurred. This may include a label indicating the alarm, e.g. "HH" for a very critical "high-high" alarm. Similarly, there may be "L" ("low") or "H" ("high") alarms where process values are too low or too high. In addition, alarms may also be shown in alarm lists that show more information about the alarm such as its title and description and the logged time when the alarm occurred. In order to allow operators to distinguish the AI-based predicted alarms from the "real" alarms, the AI-based predicted alarms could be integrated into the operator screens and presented to the user, for instance, by adding a leading "P" for "predicted" before the labels in order to indicate that this is a predicted alarm. For example, "PH" would denote a "predicted high" alarm or a "PLL" would denote a "predicted low-low" alarm. Optionally, additional information next to the alarm label may indicate, for example, the probability with which the predicted alarm will actually occur and/or the time when it will happen. Furthermore, the alarm lists could provide additional information about a predicted alarm, such as indicating in the alarm title text that this is a "predicted" alarm and not a "real" alarm".

In a preferred embodiment, the method further comprises the step of automatically adapting the control parameter to reduce the likelihood that the alarm threshold will be exceeded. Accordingly, an alarm may be prevented before it occurs without intervention of an operator. An automatic adaption may be understood as a change of one or more control parameters essentially without the interaction of a user. In this way, in particular in critical situations, an operator's relief can be ensured by a facilitated control of the distributed control system.

In another embodiment, the adaption of the control parameter may be performed at least semi-manually by an operator.

The present invention also relates to a system for managing alarms in a distributed control system. The system comprises a process parameter monitoring means, configured to monitor at least one process parameter. The system further comprises an alarm control means, which is configured to activate an alarm if the process parameter exceeds an alarm threshold and to deactivate the alarm if the process parameter no longer exceeds the alarm threshold. The system further comprises an AI based alarm control system, which is configured to determine before the alarm is activated at least one predicted alarm information, which comprises information about if the alarm threshold will be exceeded. The explanations of the same features described above with respect to the method of the present invention also apply to the system of the present invention, and it is referred in this respect to the above sections addressing said features in detail.

According to the present invention, an improved alarm managing system is provided, wherein the employment of an AI-based alarm prediction may help operators to predict alarm situations even before they occur. The system of the present invention may be part of the distributed control system or may be a separate system. The process parameter monitoring means is not limited to a single device but may also include a plurality of hardware and/or software based means, such as one or more sensors, detectors etc. and their corresponding control(s) configured to allow a detection of a condition or state of the process parameter.

The alarm control means may include a plurality of hardware and/or software based means suitable to activate an alarm if the process parameter exceeds the alarm threshold and to deactivate the alarm if the process parameter no longer exceeds the alarm threshold. This may include, for instance, any suitable alarm device(s) and their corresponding control(s) such as provision and control of alarm sirens and for visual alarms etc.

The one or more alarm thresholds concerning one or more of the process parameters may be predefined and stored respective storage means of the system. The predicted alarm information may be a visual or acoustic information about the forecasted information, for instance if a certain process parameter will exceed an alarm threshold.

The one or more process parameter may be any suitable parameter, such as for instance filling levels, mass flows, pressures, currents, temperatures etc., which may be monitored by respective detection means. For each of these parameters, a suitable range of normal operation maybe defined, which is accordingly bordered by respective upper and/or lower thresholds, indicating ranges of operation that should be preferably prevented. For instance, a pressure in a tank may be defined to operate normally between an upper and lower threshold. When the pressure exceeds the upper and/or lower threshold, an alarm may be issued. Thus, when the AI based control system determines that the threshold will be exceeded a corresponding predicted alarm information may be provided.

The predicted alarm information may preferably be provided before the threshold is exceeded and an alarm is issued. This may allow a user to take early countermeasures to avoid the activation of the alarm. The predicted alarm information may comprise information about a likelihood or probability, e.g. a percentage, indicating the chance that the threshold will be exceeded and an alarm will be activated. Further, the predicted alarm information may comprise a time information, indicating when the process parameter is predicted to exceed the threshold.

The system according to the present invention may comprise a control unit, which is configured to adapt the control parameter to reduce the likelihood that the alarm threshold will be exceeded. Said control unit may include respective hardware and/or software means to allow a suitable adaption of the control parameter.

The system according to the present invention may be particularly valuable for rare critical alarms. In these critical but rare cases, an operator may appreciate receiving an early warning that could help the operator to prevent that critical situation. Accordingly, the system according to the present invention may enable to prevent critical situations in an early stage, thus avoiding critical alarms and facilitating operation via the distributed control system.

By employing an AI based alarm control system, the system according to the present invention may also allow properly addressing also future situations, which have yet not occurred but which can be anticipated by the prediction/forecast of the AI based alarm control system, e.g. based on historical data, with which the AI based alarm control system has been trained.

In a preferred embodiment, the system further comprises an information means, which is configured to provide the predicted alarm information to a user, preferably before the alarm is activated. Thus, a user or operator may be suitably informed about the risk, that a future alarm will be issued. The information means may include one or more monitors or displays visually indicating the predicted alarm information. Alternatively or additionally, information means may include one or more audio devices acoustically indicating the predicted alarm information.

The predicted alarm information may be preferably provided before the alarm is activated. Thus, the user controlling or supervising one or more of the systems of the distributed control system may be allowed to take early suitable countermeasures to avoid a future alarm.

In a preferred embodiment, the predicted alarm information is provided when a likelihood that the alarm threshold will be exceeded exceeds a predefined likelihood threshold. Thus, the system may avoid the provision of predicted alarm information when there is only a very low likelihood that the alarm threshold will be exceeded. Thus, an operator may only be provided with relevant predictions regarding future alarms, facilitating the operation of the system according to the present invention. In other words, an alarm, which is unlikely to occur, i.e. has a low likelihood to occur, may not exceed the predefined likelihood threshold and may accordingly not be provided to a user.

A likelihood or probability may be a percentage and may be dependent on further variables or conditions. In an example, a predicted alarm information may only be provided to a user when a likelihood that the monitored process parameter will exceed the alarm threshold is above 5%.

In a preferred embodiment, the system is further configured to determine, preferably by the AI based alarm control system, at least one control parameter of the distributed control system that can be adapted to reduce a likelihood that the alarm threshold will be exceeded, and preferably to provide at least one control parameter information to the user, wherein the control parameter information comprises information about the control parameter and/or wherein the control parameter information comprises information about at least one suitable adaption of the control parameter to reduce the likelihood that the alarm threshold will be exceeded. Accordingly, the system according to the present invention may allow a user properly reacting to a forecasted alarm by determining the suitable control parameter. The system may accordingly enable for a timely counteraction regarding the forecasted development of the monitored process parameter, thus potentially avoiding a future alarm.

In a preferred embodiment, the system is further configured to provide at least one alarm information to the user when the alarm is activated, wherein the alarm information and the predicted alarm information are provided together or separately to the user. Thus, the system of the present invention may allow for an effective control and supervision of the distributed control system.

In a preferred embodiment, the system comprises a plurality of control sub-systems, wherein each of the plurality of control sub-systems is addable to and/or removable from the distributed control system, wherein the AI based alarm control system is an AI based alarm control sub-system. Thus, a modular and flexible system can be provided, wherein certain control sub-systems may be added or deleted as required by a user. The distributed control system may organize the overall system functionality in a modular manner. Accordingly, each control subsystem may be understood as a “feature” or “service”, which could be selectively included in the system. Each control sub-system may be licensed, installed/uninstalled and run/stopped individually, depending on which services a user may desire. For instance, the respective subsystems may be selectable as options for installing in a system installer tool. The plurality of control subsystems may include basic or mandatory services, which are always included and run, and additional optional services. The AI based alarm control sub-system may be provided as an optional service to allow users to license and use this feature for enhancing the control of the distributed control system.

The AI based alarm control sub-system may be provided in the installer tool in form of an “AI prediction alarm” installer feature as part of a larger installer feature that could include also different further additional AI-based features, such as an anomaly detection. When the “AI prediction alarm” feature is selected in the installer tool, a corresponding service may be listed as part of a service status viewer, indicating the selected/licensed and installed services. This may provide an improved monitoring and managing of the selected services for a user.

In a preferred embodiment, the system further comprises a non-AI based alarm control sub-system, configured to add or remove one or more first alarm rules for managing alarms of the distributed control system, wherein the system is further configured to allow an addition or removal of one or more second alarm rules for managing alarms of the distributed control system defined by the AI based alarm control sub-system.

A non-AI based alarm control sub-system may be understood as a control system, which manages alarms without the help of an AI. In particular, a non-AI based alarm control subsystem may not employ forecast information of a process parameter based on AI prediction.

Alarm rules may be understood as control rules for controlling an alarm, such as conditions for activating and/or deactivating an alarm, e.g. alarm thresholds for more process parameters. Thus, one or more first alarm rules may be created and controlled by the non-AI based alarm control subsystem to allow for a general control of the alarms in a distributed control system.

The one or more second alarm rules may be accordingly created and controlled by the AI based alarm control sub-system, in particular to complement the first alarm rules. Thus, an improved and sophisticated alarm control system can be obtained.

In a preferred embodiment, the system is further configured to allow a modification of the first alarm rules by the AI based alarm control sub-system to create one or more modified first alarm rules for managing alarms of the distributed control system. Thus, the AI based alarm control subsystem may not only provide complementary second alarm rules to the first alarm rules but may be employed to amend the first alarm rules therefore allowing for an even further improved alarm management of the distributed control system. In other words, AI-based alarms may not be created only as new alarms, but may also be based on existing alarms.

A user may be accordingly allowed to configure alarm rules for existing alarms. This may include, for example, filters, hiding rules, alarm grouping rules, and so on. In one embodiment of the system of the present invention, a user may be allowed to include an existing alarm rule into the AI based alarm control sub-system. When an alarm rule has been selected to be included, an AI-based alarm prediction service may train and/or update a corresponding AI-based prediction model that is run to predict alarms. This may include the use of trainable machine learning models, e.g. as LSTM-based time series forecasting model for multivariate time series data.

The user may accordingly choose whether to create an additional alarm rule and/or to modify existing alarm rules based on the AI based alarm control subsystem. Thus, the system according to the present invention provides a sophisticated approach to manage alarm rules in a distributed control system.

The invention further relates to a computer-program product comprising instructions, which, when executed by a computer, cause the computer to carry out and/or control any of the methods of the present disclosure.

The features of the system according to the present invention may be implemented by respective suitable digital or computational means, which can include, for instance, one or more computers, apps and/or networks. The method may be at least partly computer-implemented, and may be implemented in software or in hardware, or in software and hardware. Further, the method may be carried out by computer program instructions running on means that provide data processing functions. The data processing means may be a suitable computing means, such as an electronic control module etc., which may also be a distributed computer system. The data processing means or the computer, respectively, may comprise one or more of a processor, a memory, a data interface, or the like.

The invention further relates to a computer-readable medium comprising instructions which, when executed by a computer, cause the computer to carry out and/or control any of the methods of the present disclosure.

The features and advantages outlined above in the context of the system and the method similarly apply to the computer program product and the computer-readable medium described herein. Likewise, any features and advantages noted with regard to the method of to the present invention apply accordingly to the system of the present invention and vice versa.

A computer program may be stored/distributed on a suitable medium such as an optical storage medium or a solid-state medium, supplied together with or as part of other hardware, but may also be distributed in other forms, such as via the Internet or other wired or wireless telecommunication systems.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

LIST OF REFERENCE SIGNS

1 process parameter
3 alarm threshold
5 process parameter monitoring means
7 alarm control means
9 AI based alarm control system
11 information means
100 system for managing alarms
100*a, b, c, d* control sub-systems
100*a* AI based alarm control sub-system
100*b* non-AI based alarm control sub-system
200 method for managing alarms
300 computer program product
400 computer
500 computer-readable medium
S1 process parameter monitoring
S2 predicted alarm determination
S3 alarm activation
S4 alarm deactivation
S5 predicted alarm information provision
S6 control parameter determination
S7 control parameter information provision
S8 alarm information provision
S9 control parameter adaption

What is claimed is:

1. A method for managing alarms in a distributed control system, the method comprising:

monitoring at least one process parameter;

activating an alarm when the process parameter exceeds an alarm threshold;

deactivating an alarm when the process parameter no longer exceeds the alarm threshold;

determining by an artificial intelligence (AI) based alarm control system, before the alarm is activated at least one predicted alarm information for the alarm, which comprises information about whether the alarm threshold will be exceeded and when the alarm threshold will be exceeded, wherein the predicted alarm information includes a predicted time at which the alarm threshold will be exceeded and a probability that the alarm threshold will be exceeded; and adding, by the AI based alarm control system, one or more alarm rules to the distributed control system and modifying one or more pre-existing alarm rules of the distributed control system to create one or more modified alarm rules for managing alarms of the distributed control system.

2. The method according to claim 1, further comprising providing the predicted alarm information to a user before the alarm is activated.

3. The method according to claim 1, further comprising:

determining by the AI based alarm control system at least one control parameter of the distributed control system that is adaptable to reduce a likelihood that the alarm threshold will be exceeded, and providing at least one control parameter information to a user;

wherein the control parameter information comprises information about the control parameter; and/or wherein the control parameter information comprises information about at least one suitable adaption of the control parameter to reduce the likelihood that the alarm threshold will be exceeded.

4. The method according to claim 3, further comprising providing at least one alarm information to the user when the alarm is activated, wherein the alarm information and the predicted alarm information are provided together or separately to a user.

5. The method according to claim 3, further comprising automatically adapting the control parameter to reduce the likelihood that the alarm threshold will be exceeded.

6. The method according to claim 2, further comprising providing at least one alarm information to the user when the alarm is activated, wherein the alarm information and the predicted alarm information are provided together or separately to a user.

7. A system for managing alarms in a distributed control system, wherein the system comprises:

a process parameter monitor configured to monitor at least one process parameter;

an alarm control configured to activate an alarm when the process parameter exceeds an alarm threshold and to deactivate the alarm when the process parameter no longer exceeds the alarm threshold;

an artificial intelligence (AI) based alarm control system configured to determine at least one predicted alarm information before the alarm is activated, the AI based alarm control system comprising information about whether the alarm threshold will be exceeded and when the alarm threshold will be exceeded, wherein the predicted alarm information includes a predicted time at which the alarm threshold will be exceeded and a probability that the alarm threshold will be exceeded; and wherein the AI based alarm control system adds one or more alarm rules to the distributed control system and modifies one or more pre-existing alarm rules of the distributed control system to create one or more modified alarm rules for managing alarms of the distributed control system.

8. The system according to claim 7, wherein the system further comprises an information device configured to provide the predicted alarm information to a user before the alarm is activated.

9. The system according to claim 8, wherein the predicted alarm information is provided when a likelihood that the alarm threshold will be exceeded in the future is greater than a predefined likelihood threshold.

10. The system according to claim 7, wherein the system is further configured to:

determine by the AI based alarm control system at least one control parameter of the distributed control system that is adaptable to reduce a likelihood that the alarm threshold will be exceeded; and provide at least one control parameter information to a user;

wherein the control parameter information comprises information about the control parameter; and/or wherein the control parameter information comprises information about at least one suitable adaption of the control parameter to reduce the likelihood that the alarm threshold will be exceeded.

11. The system according to claim 7, wherein the system is further configured to provide at least one alarm information to a user when the alarm is activated, wherein the alarm information and the predicted alarm information are provided together or separately to the user.

12. The system according to claim 7, wherein the system further comprises a plurality of control sub-systems, wherein each of the plurality of control sub-systems is addable to and/or removable from the distributed control system, and wherein the AI based alarm control system is an AI based alarm control sub-system.

13. The system according to claim 12, wherein the system further comprises a non-AI based alarm control sub-system configured to add or remove one or more first alarm rules for managing alarms of the distributed control system, wherein the system is further configured to allow an addition or removal of one or more second alarm rules for managing alarms of the distributed control system defined by the AI based alarm control sub-system.

14. The system according to claim 13, wherein the system is further configured to allow a modification of the first alarm rules by the AI based alarm control sub-system to create one or more modified first alarm rules for managing alarms of the distributed control system.

* * * * *